L. McMURRAY.
Improvement in Soldering Tools.
No. 123,276.
Patented Jan. 30, 1872.
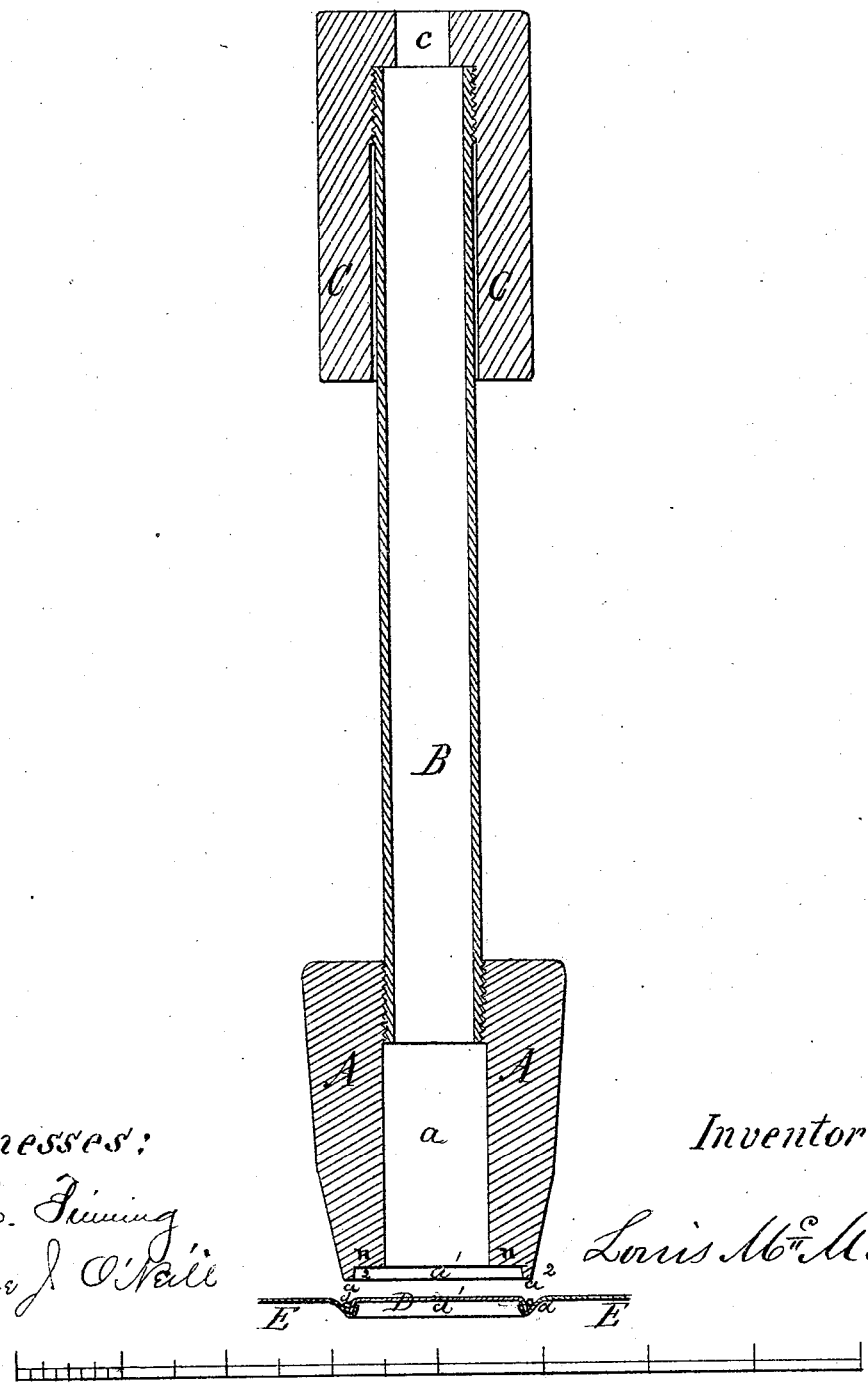
Witnesses:
H. C. Finning
Eugene J. O'Neill
Inventor:
Louis McMurray 123,276

UNITED STATES PATENT OFFICE.

LOUIS McMURRAY, OF BALTIMORE, MARYLAND.

IMPROVEMENT IN SOLDERING-TOOLS.

Specification forming part of Letters Patent No. 123,276, dated January 30, 1872.

*Know all men by these presents:*

That I, LOUIS MCMURRAY, of Baltimore, Maryland, have invented a new and useful Improvement in Soldering-Tools adapted to certain purposes.

My improvement can best be understood by referring to what has already been done in the same direction. On the 6th day of June, 1871, Letters Patent of the United States, numbered 115,760, were granted to myself and Robert Hollingsworth for an improvement in soldering-tools, to be used in soldering the tin caps on the tops of fruit and other cans of the same description, and where a flange on the under side of the soldering-block meets the wire of solder that rests in the groove prepared for it, so as to unite the top and the cap, the cap being pressed upon the top and kept in place during the operation by an iron rod passing through a hole in the soldering-block and the wooden handle attached to it. There are objections to this contrivance, which I now propose to overcome. The main feature in my improvement consists in dispensing altogether with the iron rod to keep down the cap, and so adjusting the depth of the depression within the flange that the bottom of the soldering-block shall keep the cap in place as long as required to complete the soldering.

A reference to the accompanying drawing will explain.

A represents the soldering-block; B and C, its handle; and $a$ B $c$, the opening lengthwise through the entire tool. $a$ represents the depression at the bottom of the block, which is so deep that when the flange $a^2$ rests on the melted soldering-wire at $d$ the face of the block at $n$ $n$ rests on the cap D.

The operation of the tool is easily understood. The cap is put on the top E E of the can, the wire of solder $d$ is laid in its place in the groove prepared for it, and the tool, properly heated, applied and turned by the workman horizontally to aid in the operation. The contact of the face of the block with the cap while the flange is melting the solder prevents the ascent of the latter by the capillary attraction which would otherwise take place, and any steam of the article in the case, or gas or fumes from the melted rosin, find an exit through the hollow handle. The tendency of the wire rod in the invention above referred to, to close the hole in the cap, as well as the disturbance of the cap, is obviated, and the whole operation is performed more rapidly and better by less expert hands, and therefore more economically, than the invention aforesaid.

What I claim as new in the above, and desire to secure by Letters Patent, is—

The soldering-block A having a face, $a^1$, and flange $a^2$, arranged, in relation to each other, so that the face holds the cap in position while the flange melts the solder during the operation of soldering, in combination with the opening $a$ B $c$ through the block and handle, all substantially as herein shown and described.

LOUIS McMURRAY.

Witnesses:
   J. G. GEHRING,
   JUSTUS STEHL.